United States Patent
Ritter et al.

(10) Patent No.: US 8,351,636 B2
(45) Date of Patent: Jan. 8, 2013

(54) GLASSES FRAME COMPRISING AN INTEGRATED ACOUSTIC COMMUNICATION SYSTEM FOR COMMUNICATION WITH A MOBILE RADIO APPLIANCE, AND CORRESPONDING METHOD

(75) Inventors: Rudolf Ritter, Zollikofen (CH); Eric Lauper, Bern (CH)

(73) Assignee: Swisscom (CH)

( * ) Notice: Subject to any disclaimer, the term of this patent is extended or adjusted under 35 U.S.C. 154(b) by 1196 days.

(21) Appl. No.: 10/593,424

(22) PCT Filed: Mar. 29, 2005

(86) PCT No.: PCT/EP2005/051425
§ 371 (c)(1),
(2), (4) Date: Jan. 18, 2007

(87) PCT Pub. No.: WO2005/094157
PCT Pub. Date: Oct. 13, 2005

(65) Prior Publication Data
US 2007/0160254 A1 Jul. 12, 2007

(30) Foreign Application Priority Data
Mar. 31, 2004 (EP) .................................. 04101327

(51) Int. Cl.
*H04R 25/00* (2006.01)
*H04R 3/00* (2006.01)
(52) U.S. Cl. ........................... 381/381; 381/327; 381/92

(58) Field of Classification Search .................. 381/381, 381/327, 110, 56, 57, 71.1, 92, 94.1
See application file for complete search history.

(56) References Cited

U.S. PATENT DOCUMENTS

| | | | |
|---|---|---|---|
| 4,901,354 A * | 2/1990 | Gollmar et al. | 381/110 |
| 5,335,011 A * | 8/1994 | Addeo et al. | 348/14.1 |
| 5,483,599 A | 1/1996 | Zagorski | |
| 5,682,210 A | 10/1997 | Weirich | |
| 5,903,397 A | 5/1999 | Melville et al. | |
| 6,474,816 B2 * | 11/2002 | Butler et al. | 351/221 |
| 7,013,009 B2 * | 3/2006 | Warren | 379/420.01 |
| 2002/0197961 A1 | 12/2002 | Warren | |
| 2004/0155186 A1* | 8/2004 | Nestorovic et al. | 250/330 |

FOREIGN PATENT DOCUMENTS

| | | |
|---|---|---|
| DE | 199 59 493 A1 | 5/2000 |
| EP | 0 219 026 A1 | 4/1987 |
| EP | 0 562 742 A1 | 9/1993 |
| GB | 2 377 581 A | 1/2003 |
| WO | WO 02/086599 A1 | 10/2002 |
| WO | WO 03/062906 A1 | 7/2003 |
| WO | WO 2004/016037 A1 | 2/2004 |

\* cited by examiner

*Primary Examiner* — Hai Phan
(74) *Attorney, Agent, or Firm* — McAndrews, Held & Malloy, Ltd.

(57) ABSTRACT

A system and method for acoustical communication, in which an eyeglass frame includes at least one directionally dependent microphone for capturing voice signals of a user and a communication device for signal transmission to external electronic devices, so that the directional dependence of the at least one microphone is user-specifically adjustable in an adaptive way. The directionally dependent microphones can be implemented as microphone arrays and/or in MEMS technology, and contact microphones can be used.

38 Claims, 3 Drawing Sheets

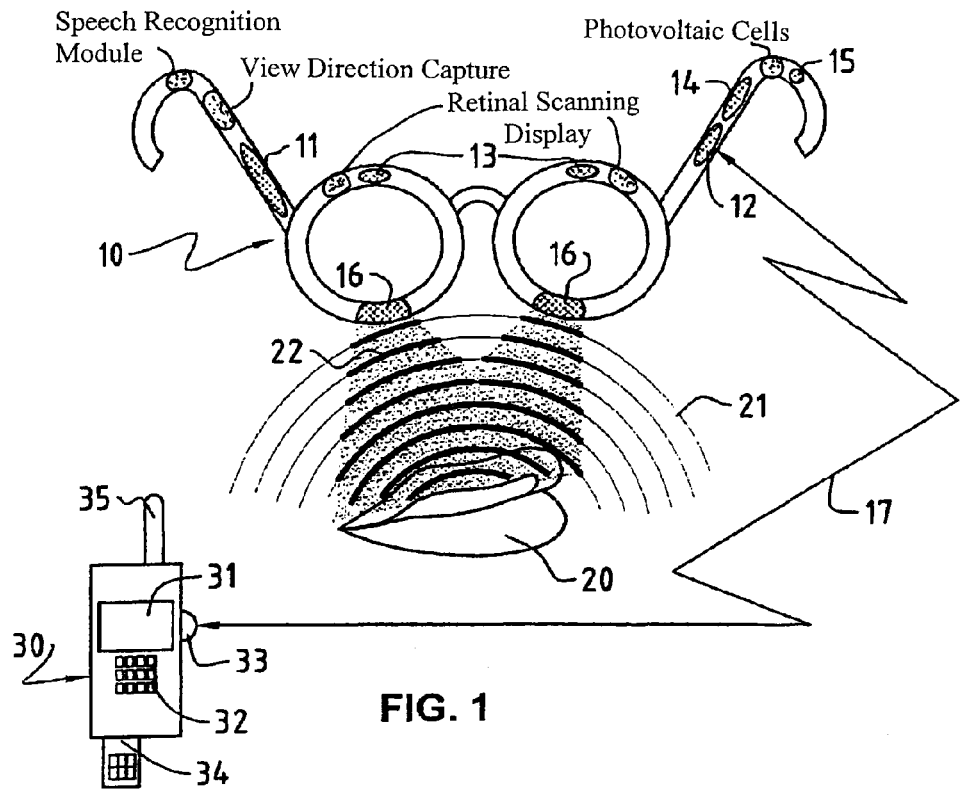
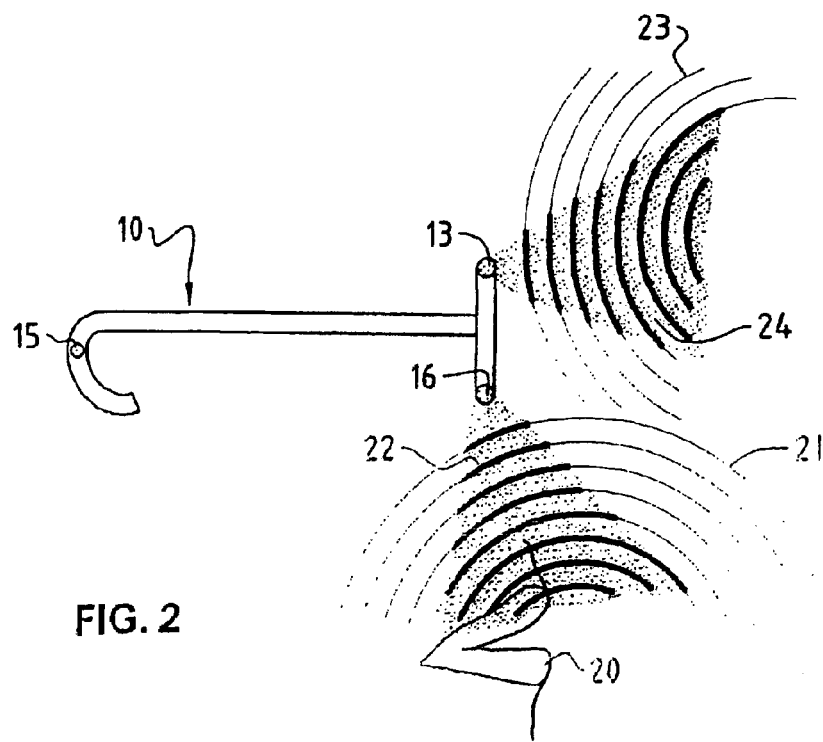

GLASSES FRAME COMPRISING AN INTEGRATED ACOUSTIC COMMUNICATION SYSTEM FOR COMMUNICATION WITH A MOBILE RADIO APPLIANCE, AND CORRESPONDING METHOD

This invention relates to a method and a system for acoustical communication in which an eyeglass frame comprises at least one directionally dependent microphone for capturing voice signals of a user, as well as communication means for signal transmission to external electronic devices. In particular it relates to a communication system in which the directional dependence of the at least one microphone is user-specifically adjustable in a dynamic way.

Mobile communication terminals play today an increasingly important role. The newer mobile communication terminals nowadays serve not only simple voice or data communication, but they transform themselves more and more into complex multimedia devices by means of which audio or video broadcasts can be received, for example, games can be played, or information can be accessed within networks such as the Internet or mobile radio networks. The control of these complex mobile communication terminals, in particular selection of available data and/or data sets or the operational modes, as well as entry of data and/or entry of commands often proves to be involved, and often entails use of expensive and unmanageable auxiliary devices such as keyboards, styluses, trackballs, touch screens, etc. In this connection it is also essential in each instance to hold the mobile communication device in one's hand, severely restraining hands-free and convenient use of modern communication terminals.

Thus solutions based on speech recognition are already known in the state of the art. Speech recognition or automatic speech recognition deals with the study and development of methods allowing machines such as computers to recognize spoken language or respectively to convert it into character strings and process it. In the meantime speech recognition has also found technical applications in automatic dialog systems, for instance, such as e.g. timetable inquiry. Automatic speech recognition is being practiced everywhere where only a limited vocabulary is used. With automated speech recognition, however, the quality of the acoustical reception plays a decisive role, and therefore it is essential for the reception quality to be improved as far as possible so that a significantly higher precision in recognition can be achieved.

The publications WO 03/062906 and WO 02/086599 describe, for example, a device in which microphones and miniature loudspeakers are disposed on an eyeglass frame. The eyeglass frame is then connected to an external electronic device via a cable connection. The problem with this proposed device, however, is the difficulty in achieving an acceptable noise elimination for user-specific sound and audio recordings, and in particular in distinguishing spoken commands of a user from voices of other persons located in the vicinity.

Described in the publication EP 0 219 026 B1 is how a hearing aid can be built into an eyeglass frame. Through a particular spatial distribution of several microphones on the eyeglass frame, a directional as well as a locating effect may be achieved which should enable the hearing-impaired person to obtain a spatial orientation in relation to an acoustic event. All acoustical and electronic components are accommodated in the eyeglasses. A transmitting and/or receiving connection to external electronic devices is not provided for.

Disclosed in the published application US 2002/0197961 A1 is an eyeglass frame in which are installed microphones, miniature loudspeakers, power supply (accumulator) and transmitter or respectively receiver for the transmission of signals to a mobile radio device or other external electronic devices. Alternatively, the components may also be accommodated in a clip which can be attached to the eyeglass frame and removed again, or on a hat or similar article worn on the head. The microphones can also be put on an adjustable arm. With use of the last-mentioned configuration in an environment with loud and non-constant static noise it is nevertheless not ensured that the wanted signal is applied at the microphone at a sufficient level.

It is an object of this invention to propose a new system and a new method for acoustical communication not having the above-mentioned problems of the state of the art. In particular the system should make possible a convenient, hands-free use of mobile radio devices, as well as reliable and convenient entry of spoken commands and interactive speech control in connection with IVR systems (Interactive Voice Response) in noisy environments.

These objects are achieved according to the invention in particular through the elements of the independent claims. Further advantageous embodiments follow moreover from the dependent claims and from the specification.

In particular these objects are achieved through the invention in that an eyeglass frame comprises at least one directionally dependent microphone for capturing voice signals of a user as well as communication means for signal transmission to external electronic devices, the directional dependence of the at least one microphone being user-specifically adaptable in a dynamic way. The advantages of this embodiment variant are, among others, that an effective noise elimination and thereby a significantly higher quality of the captured voice signals is possible for each individual user. This can be a necessary prerequisite particularly for recognition of spoken commands of the user. Further advantages are the hands-free entry of spoken instructions as well as the fact that the input device is barely visible because it is integrated into the eyeglass frame.

In another embodiment variant, the system comprises a control module for adaptive user-specific adjustment of the directional dependence of the at least one first directionally dependent microphone, based on the voice signals captured by the at least one second directionally dependent microphone. This embodiment variant has the advantage, among others, that the adjustment of the directional dependence of the directionally dependent microphones can be carried out as a function of the signals captured by the other microphones. A still better user-specific adaptation can thereby be achieved, resulting in enhanced voice quality and better pre-requisites for application of the system and method according to the invention in environments with high levels of interfering noises.

In a further embodiment variant, at least one second directionally dependent microphone is a contact microphone. This embodiment variant has the advantage, among others, that the voice signals transmitted by the speaking user can be captured not only after propagation in the air, but also after propagation in the body of the user. After a corresponding handling and processing, a further improvement in the elimination of noise can thereby be achieved. In particular, it can very easily be determined by means of a contact microphone whether the user is speaking just now or not, whereby a possible confusion with a further user speaking in the vicinity can be practically eliminated. Moreover the signals captured by a contact microphone are very well suited to be used by the control module for adaptive user-specific adjustment of the directional dependence of the other directionally dependent microphones.

In still another embodiment variant, the signal captured by a first directionally dependent microphone (16) is filtered by means of the signal captured by a third microphone (13). This embodiment variant has the advantage, among others, that the ambient noise captured by another microphone can be used for filtering and signal quality enhancement of the signals captured by the first directionally dependent microphone. The positive features of the directionally dependent microphone are thereby combined in an optimal way with the positive features of a noise elimination through filtering, leading to still better voice quality.

In a further embodiment variant, the at least one directionally dependent microphone is implemented as a microphone array. The at least one microphone array can be advantageously implemented in MEMS technology, for instance. This embodiment variant has the advantage, among others, that an especially effective and intensive directional effect can thereby be achieved. Through the use of microphone groups, many spatial features of the sound waves can also be exploited, which could not be made use of with a simple microphone. Further advantages of this embodiment variant are the much lower production costs and the high integration rate, whereby an especially small and compact construction can be achieved.

In another embodiment variant, the external device comprises a mobile radio device. The mobile radio device can thereby be integrated into an eyeglass frame, for example, or exist as a self-contained device. This embodiment variant has the advantage, among others, that the system according to the invention and the method according to the invention can be used for voice communication over a mobile radio network. Thus the wearers of the eyeglasses can also communicate via the eyeglass frame with one or more servers connected to the mobile radio network, or enter acoustical instructions. Therefore the wearers of the eyeglasses do not need to use any supplementary hands-free devices, whereby they are able to communicate significantly less expensively and more conveniently.

In another embodiment variant the eyeglass frame comprises means for retinal scanning display. A retinal scanning display is a display device in which a beam of light is projected directly onto the retina in the eye. Through a corresponding light modulation and a quick resolution of the beam of light, whole pictures can be shown. The eyeglass frame can further comprise further means for capturing the direction of view. This embodiment variant has the advantage, among others, that a complex system can thereby be configured making it possible for the user to see information directly and to hear it directly without being dependent upon external output devices. At the same time, by means of view capture, a further possibility for data input can be integrated into the system.

In a further embodiment variant, the system comprises a speech recognition module for capturing spoken commands by means of the at least one directionally dependent microphone. This embodiment variant has the advantage that data can be controlled and/or selected by the user in a simple way by means of the spoken commands. Further advantages are lower power consumption because all devices are integrated in the same frame.

In a further embodiment variant the communication system comprises Bluetooth and/or ZigBee and/or GSM and/or UMTS and/or WLAN interfaces. These interfaces can be integrated, for example, in the communication terminal and/or in the communication means of the eyeglass frame. This has the advantage, among others, that current industry standards can be accessed by means of the communication system.

It should be stated here that in addition to the system according to the invention, the present invention also relates to a method for acoustical communication.

Embodiment variants of the present invention will be described in the following with reference to examples. The examples of the embodiments are illustrated by the following attached figures:

FIG. 1 shows a block diagram illustrating schematically a system and method for acoustical communication according to the invention.

FIG. 2 shows a lateral view of an eyeglass frame which can be used for carrying out the inventive system and method according to FIG. 1.

Figure 3:
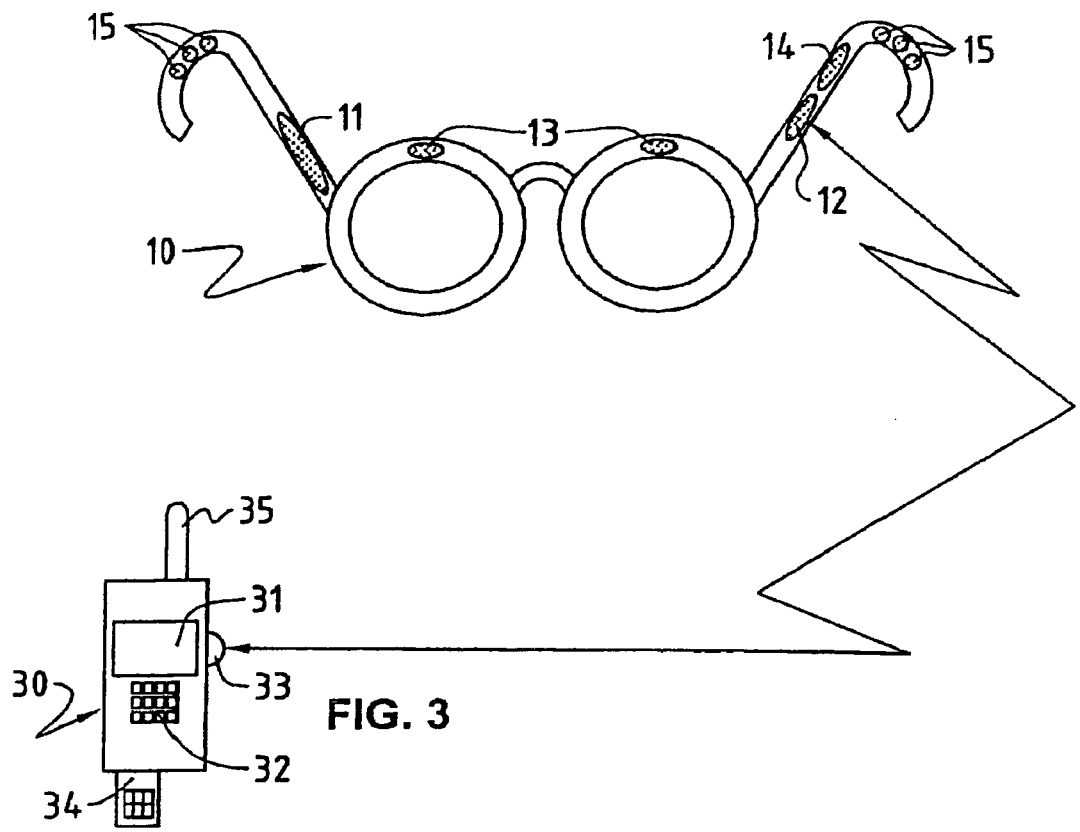
FIG. 3 shows a block diagram illustrating schematically another embodiment of the system and method according to the invention for acoustical communication.

In FIG. 1, the reference numeral 10 refers to an eyeglass frame, for instance an eyeglass frame with corrective lenses worn by near-sighted or far-sighted individuals, or a frame for sunglasses having shaded lenses. The eyeglass frame 10 comprises at least one directionally dependent acoustical sensor 16 at the place where sound waves 21 emanating from the mouth of a user 20 can be captured. Through the directional dependence of the sensor 16 the sound waves 22 emanating from the mouth of a user 20 in direct line of propagation can be particularly well captured. The directionally dependent acoustical sensor 16 can be a simple microphone, for example, but it can also be implemented as a group of microphones or a so-called microphone array. Through use of a microphone array the spatial features of the sound field can be exploited and the quality, or respectively comprehensibility, of the signals captured can thereby be enhanced considerably. A multiplicity of such microphones or microphone arrays 16 can likewise be installed on the eyeglass frame 10, symmetrically on both sides of the eyeglass frame 10, for example.

Figure 6:
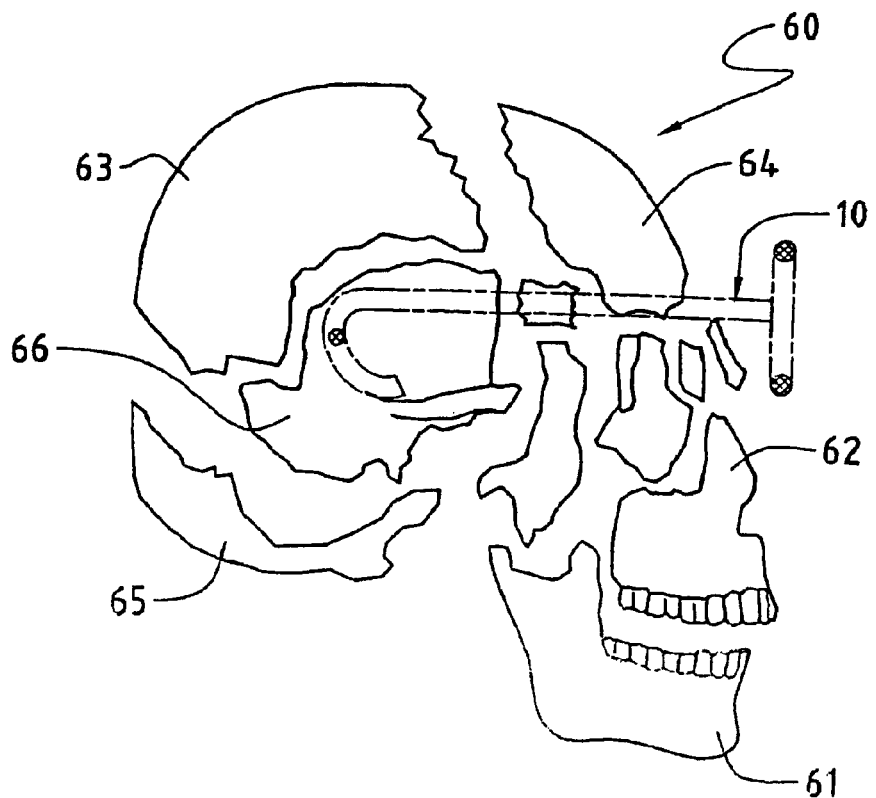
FIG. 6 shows an exploded view of the bones of a human cranium in which the approximate typical position is shown of an eyeglass frame being worn that can be used for implementing the system and method according to the invention.

As also shown in FIG. 1 or in FIG. 2, the eyeglass frame 10 can further comprise one or more directionally dependent acoustical sensors 15. The further directionally dependent acoustical sensor 15 is installed at the place where the bodily vibration sound signals of a user can be well captured by this directionally dependent acoustical sensor 15. The bodily vibration sound signals originate in that sound waves are produced in the larynx of the user when speaking, which sound waves are then propagated by the body of the user. Particularly favorable positions for receiving and capturing bodily vibration sound signals are temporal bones 66, which are located on both sides of the human cranium 60, as shown in FIG. 6. The arms of an eyeglass frame 10 are usually worn abutting the temporal bone, which can contribute to a higher quality of the captured bodily vibration sound waves. The directionally dependent acoustical sensor 15 can likewise be implemented as a simple microphone or as a group of microphones or a so-called microphone array.

In FIGS. 1 and 2 the reference numeral 13 refers to one or more further directionally dependent acoustical sensors 13. The one or more further directionally dependent acoustical sensor 13 is installed at a place on the eyeglass frame 10 where in particular the ambient sounds coming from the environment of the user can be especially well captured. The directionally dependent acoustical sensor 13 can likewise be implemented as a simple microphone or as a microphone array for better quality of the captured signal, and a multiplicity of directionally dependent microphones or microphone arrays 13 aligned in relation to the ambient sounds can also be installed on the eyeglass frame 10.

The microphones or respectively the microphone arrays 13, 15, 16 can be implemented in particular in the so-called MEMS technology (MicroElectroMechanical Systems). Understood by MEMS are the tiniest chips having a certain logic and at least certain movable parts. Therefore MEMS are, as a rule, processors with mechanical parts which are able to collect data as well as carry out tasks resulting from these data. Thus very small microphones or microphone arrays can be produced through use of MEMS technology which are able to achieve a still better sound quality with small overall size at the same time, making them especially well suited for installation in eyeglass frames 10.

In FIG. 1, the reference numeral 11 refers to a control module. The control module is able to obtain and evaluate signals from the directionally dependent acoustical sensors 13, 15, 16. The control module 11 can also communicate with the directionally dependent acoustical sensors 13, 15, 16, and control them. In particular, through the use of MEMS technology, the directionally dependent acoustical sensors 13, 15, 16 can be controlled in an especially simple way and without much effort. The position, sensitivity and/or directional dependence of the directionally dependent acoustical sensors 13, 15, 16 can thereby be influenced, for example. For instance, based on voice signals captured by a directionally dependent acoustical sensor 13, 15, 16, the control module 11 can control another directionally dependent acoustical sensor 13, 15, 16. All the components needed for signal processing, signal amplification and other signal handling can be accommodated in the eyeglass frame 10 and in particular in the control module 11, for example amplifier 46, 48, 51, adjustment elements 43, control circuits 44, 54, or delay elements 47.

In an embodiment variant of the solution according to the invention, e.g. bodily vibration sound waves are produced in the larynx of the speaking user and are propagated by the body. These bodily vibration sound waves or respectively voice signals are also propagated to the cranial bones and to the temporal bone, where they are captured by the directionally dependent acoustical sensor 15. The captured voice signals are interpreted and evaluated by the control module 11, and the directionally dependent acoustical sensors 16 are user-specifically adjusted, based on the evaluation. In particular, the control module 11 can change the position of the directionally dependent acoustical sensors 16, implemented in MEMS technology, so that they make better allowance for the physiognomy of the user. The control module 11 can likewise change the sensitivity of the directionally dependent acoustical sensors 16 in a user-specific way such that they react especially sensitively to the voice signals emanating from the mouth of the user 20 during impingement of the bodily vibration sound waves on the temporal bone.

In another embodiment variant of the solution according to the invention, not only are bodily vibration sound waves from the speaking user captured by the directionally dependent acoustical sensors 13, but also the ambient sounds coming from the environment. The bodily vibration sound waves captured by the first directionally dependent acoustical sensors 15 and the ambient noise signals captured by the second directionally dependent acoustical sensors 13 are interpreted and evaluated by the control module 11, and the directionally dependent acoustical sensors 16 are user-specifically adjusted, based on the evaluation. In particular with ambient sounds which remain constant it can happen that an adaptive or dynamic user-specific adjustment of the directional dependence of the directionally dependent acoustical sensors 16 becomes necessary: the user might suddenly speak more softly because he broaches a subject which is confidential in nature and should not be perceived by persons located in the vicinity. Thus understood by adaptive user-specific adjustment is a dynamic adjustment in which the directional dependence of the microphones is adapted to optimal values in a dynamic way, for example using MEMS microphones.

In particular the eyeglass frame 10 is also provided with a physical network interface 12, by means of which spoken information and/or information in the form of data is able to be exchanged between the eyeglass frame 10 and a mobile communication terminal 30 via the communication channel 17. The network interface 12 can support a multiplicity of different network standards, for example local wireless network standards known by the names of Bluetooth or ZigBee, but also the GSM (Global System for Mobile Communication), GPRS (Generalized Packet Radio Service), UMTS (Universal Mobile Telecommunications System), WLAN (Wireless Local Area Network) 802.11, infrared communication technology, or any other contactless communication technology. In principle, however, the network interface 12 could also be any contacted interface, for instance a USB or a Firewire interface or an interface to Ethernet, Token Ring or any other wired LAN (Local Area Network). The interface can of course comprise not only packet-switched interfaces as they use network protocols such as e.g. Ethernet or Tokenring directly, but also circuit-switched interfaces, which are able to be used by means of protocols such as e.g. PPP (Point-to-Point Protocol), SLIP (Serial Line Internet Protocol) or GPRS (Generalized Packet Radio Service), i.e. which interfaces have e.g. no network address, such as a MAC or a DLC address. As a matter of principle, it must be emphasized that the system and/or method according to the invention is not bound to a specific network standard, insofar as the features according to the invention are present, but instead they can be achieved with one or more desired networks, in particular also by the voice and/or data transmission being switched or routed transparently between the different communication technologies. Moreover further required components may be accommodated in the eyeglass frame 10, for instance loudspeakers and power supply.

The reference numeral 30 in FIG. 1 refers to a mobile communication terminal or any desired so-called Customer Premises Equipment (CPE). The mobile communication terminal 30 can be any mobile radio device of any mobile radio network; the mobile radio device may be a GSM device of a GSM mobile radio network, for example, or a UMTS device of a UMTS network, or a satellite device of a satellite network. However, the mobile communication terminal 30 can in principle also be a standard Personal Computer (PC), a portable PC, a fixed net telephone, a charging device for a mobile radio device, a play station or any other device with electronically networked components. The mobile communication terminal 30 comprises an input unit 32 for input of data elements, for example. The mobile communication terminal 30 can have a standard keyboard or a similar input device, according to the type of mobile radio telephone, consisting for instance of numerical keys and control keys, the numerical keys being able to be switched over to input of letters, for example. For the purposes of authorization and authentication, for example in the case of a registration of fees in telecommunication, the mobile communication terminal 30 as a rule contains a removable identification module, for instance an SIM (Subscriber Identity Module) card 34, which is shown here below on the terminal 30 and comes into contact with contacts inside the mobile communication terminals when in operation. The mobile communication terminal 30 can further comprise a display device 31 for displaying data elements. An antenna 35 serves in a known way for transmission of data over a telecommunication network, which, as a rule, is a mobile radio network, for instance a GSM (Global System for Mobile Communication) network, a UMTS (Universal Mobile Telecommunication System) network or a WLAN (Wireless Local Area Network) network. Installed on the mobile communication terminal 30 is a contactless interface 33, for example, via which data and commands from the contactless interface 12 of the eyeglass frame 10 can be received and transmitted.

Figure 4:
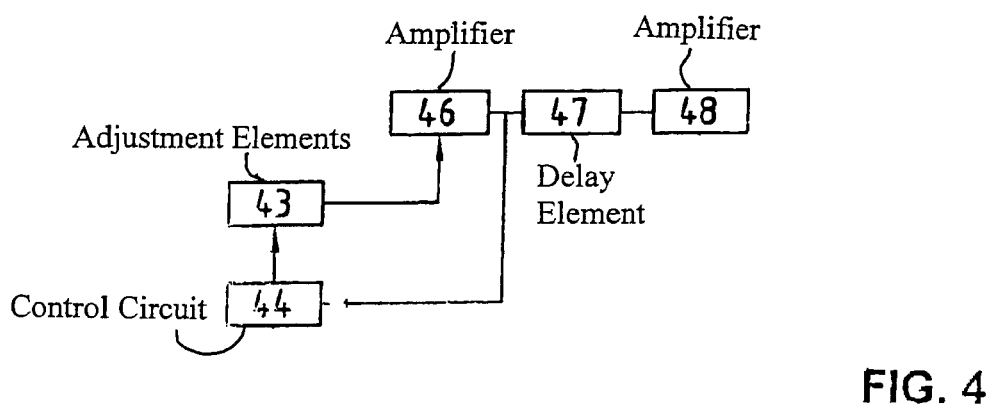
FIG. 4 shows a block diagram illustrating schematically the structure of the inventive system for acoustical communication according to FIG. 1.

The structure of an embodiment variant of the system according to the invention and of the method according to the invention is illustrated in FIG. 4. Received by the first directionally dependent acoustical sensors 16 are above all voice signals from the mouth region of the user 22, while the second directionally dependent acoustical sensors 13 are directed above all toward the ambient sound coming from the vicinity. The third directionally dependent acoustical sensors 15 are set up and positioned such that they are able to capture above all voice signals from the bodily vibration sound of the user. The voice signals captured by the first and by the second directionally dependent acoustical sensors 13, 16 are adjusted by a signal adjusting module 43 and a control circuit 44 to minimum ambient noise level at the output of the differential amplifier 46. The voice signals captured by the third directionally dependent acoustical sensors 15 are used by the amplifier controller 48 such that in the case of "no bodily vibration sound" the amplification of the voice signals captured by the first directionally dependent acoustical sensors 16 are not amplified too much. However, in the case of "bodily vibration sound present" the amplifier is set such that the voice signals captured by the first directionally dependent acoustical sensors 16 are amplified in relation to the voice signals captured by the second directionally dependent acoustical sensors 13. So that no distortions arise owing to running times, a signal delay module 47 can be provided.

Figure 5:
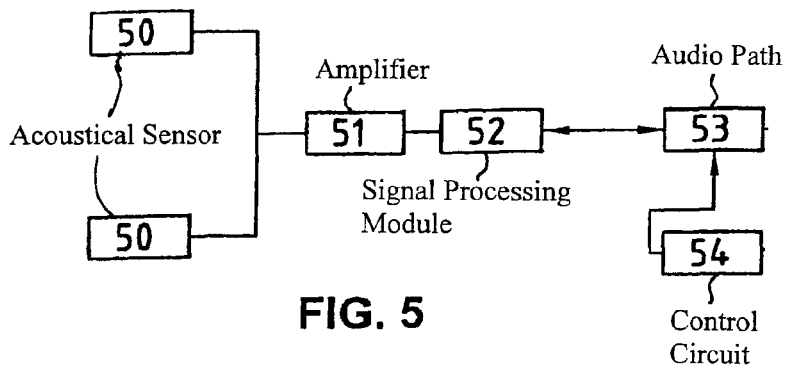
FIG. 5 shows a block diagram illustrating schematically the structure of another embodiment of the inventive system for acoustical communication according to FIG. 3.

Illustrated in FIG. 3 is another embodiment variant of the system according to the invention and of the method according to the invention. The reference numeral 10 relates again to an eyeglass frame comprising one or more directionally dependent acoustical sensors 15 which are installed at a place where the bodily vibration sound signals of a user can be well captured by this directionally dependent acoustical sensor 15. The directionally dependent acoustical sensor 15 can likewise be implemented as a simple microphone or as a group of microphones or a so-called microphone array and/or in MEMS technology. The voice signals captured by the at least one directionally dependent acoustical sensor 15 is transmitted to a control module 11. As shown in FIG. 5, the voice signal captured by the directionally dependent acoustical sensors 50 is amplified by an amplifier 51 in the control module 11, processed with respect to level and frequency by a signal processing module 52 and subsequently by a reference and control circuit 54 such that the captured microphone signals correspond in characteristic to those voice signals captured by an ordinary microphone. Then the voice signals are added to the audio path 53 of the mobile communication terminal 30. The reference for the reference and control circuit 54 are recorded for each user in the mobile communication terminal 30 by the microphone of the devices, for example. The signal processing module 52 as well as the reference and control circuit 54 can be disposed both in the eyeglass frame 10 as well as in the mobile communication terminal.

The energy source for the power supply 14, for feed of the electronic system can be carried out in particular via photovoltaic cells (not shown), which are vacuum-metallized on the eyeglass lenses. Moreover it can be carried out by way of a common battery integrated in the eyeglass frame 10 or connected thereto.

What is claimed:

1. A system for acoustical communication comprising:
an eyeglass frame having a plurality of directionally dependent microphones to capture one or more voice signals;
a transmitter configured to transmit data comprising said one or more captured voice signals to one or more external electronic devices;
a display module configured to display video data in accordance with a user's direction of view; and
a control module configured to adjust directional dependence of at least a first directionally dependent microphone of said plurality of directionally dependent microphones based on said one or more voice signals captured by said first directionally dependent microphone and at least a second directionally dependent microphone of said plurality of directionally dependent microphones, wherein said second directionally dependent microphone is located on an ear engaging portion of said eyeglass frame for capturing bodily vibration sound waves.

2. The system for acoustical communication according to claim 1, wherein said second directionally dependent microphone is a contact microphone.

3. The system for acoustical communication according to claim 1, wherein said one or more voice signals captured by said first directionally dependent microphone are filtered by said control module based on said one or more voice signals captured by a third directionally dependent microphone.

4. The system for acoustical communication according to claim 1, comprising an amplifier controlled by one or more voice signals captured by a third directionally dependent microphone.

5. The system for acoustical communication according to claim 1, wherein said one or more voice signals captured by a directionally dependent microphone are processed based on reference filters.

6. The system for acoustical communication according to claim 1, wherein at least one directionally dependent microphone is included in at least one microphone array.

7. The system for acoustical communication according to claim 6, wherein said at least one microphone array is implemented in MEMS technology.

8. The system for acoustical communication according to claim 1, wherein said one or more external electronic devices comprises a mobile radio device.

9. The system for acoustical communication according to claim 1, wherein said eyeglass frame comprises a retinal scanning display.

10. The system for acoustical communication according to claim 9, wherein said eyeglass frame comprises a direction module configured to capture a direction of view.

11. The system for acoustical communication according to claim 1, comprising a speech recognition module configured to capture spoken commands via at least one directionally dependent microphone.

12. The system for acoustical communication according to claim 1, comprising: at least one of: Bluetooth, ZigBee, GSM and UMTS interfaces.

13. The system for acoustical communication according to claim 1, wherein said eyeglass frame comprises photovoltaic cells configured to supply power.

14. The system for acoustical communication according to claim 1, wherein said control module adjusts a position of at least said first directionally dependent microphone based on said one or more voice signals captured by said first directionally dependent microphone and at least a second directionally dependent microphone of the plurality of directionally dependent microphones.

15. A method for acoustical communication, comprising:
capturing one or more voice signals via a plurality of directionally dependent microphones;
transmitting data comprising said one or more captured voice signals to one or more external devices;
displaying video data in accordance with a user's direction of view; and
adjusting, via a control module, directional dependence of at least a first directionally dependent microphone of said plurality of directionally dependent microphones based on said one or more voice signals captured by said first directionally dependent microphone and at least a second directionally dependent microphone of said plurality of directionally dependent microphones; wherein said second directionally dependent microphone is positioned for capturing bodily vibration sound waves.

16. The method for acoustical communication according to claim 15, wherein second directionally dependent microphone is a contact microphone.

17. The method for acoustical communication according to claim 15, comprising filtering said one or more voice signals captured by said first directionally dependent microphone based on said one or more voice signals captured by a third directionally dependent microphone.

18. The method for acoustical communication according to claim 15, comprising controlling an amplifier with said one or more voice signals captured by a third directionally dependent microphone.

19. The method for acoustical communication according to claim 15, comprising processing said one or more voice signals captured by a directionally dependent microphone based on reference filters.

20. The method for acoustical communication according to claim 15, wherein said at least one directionally dependent microphone is included in at least one microphone array.

21. The method for acoustical communication according to claim 20, wherein said at least one microphone array is implemented in MEMS technology.

22. The method for acoustical communication according to claim 15, comprising transmitting said one or more captured voice signals to a mobile radio device.

23. The method for acoustical communication according to claim 15, comprising projecting image data onto a retina via a retinal scanning display.

24. The method for acoustical communication according to claim 23, comprising capturing, via a module, a direction of view.

25. The method for acoustical communication according to claim 15, comprising capturing spoken commands via a speech recognition module.

26. The method for acoustical communication according to claim 15, comprising transmitting said one or more captured voice signals to said one or more external devices via at least one of: Bluetooth, ZigBee, GSM and a UMTS interface.

27. The method for acoustical communication according to claim 15, comprising: providing power via a power supply of photovoltaic cells.

28. A system for acoustical communication comprising:
an eyeglass frame having a plurality of recording means for capturing one or more voice signals;
communication means for transmitting data comprising said one or more captured voice signals to one or more external electronic devices;
display means for projecting video data in accordance with a user's direction of view;
control means for dynamically adjusting directional dependence of at least a first recording means of the plurality of recording means based on said one or more voice signals captured by said first recording means and at least a second recording means of said plurality of recording means; and ear engagement means for holding said second recording means for capturing bodily vibration sound waves.

29. A system for acoustical communication, said system comprising:
a plurality of directionally dependent microphones to capture one or more voice signals;
a transmitter configured to transmit data comprising said one or more captured voice signals to one or more external electronic devices;
a display module configured to display video data in accordance with a user's direction of view; and
a control module configured to adjust directional dependence of at least a first directionally dependent microphone of said plurality of directionally dependent microphones based on said one or more voice signals captured by said first directionally dependent microphone and at least a second directionally dependent microphone of said plurality of directionally dependent microphones, wherein said second directionally dependent microphone is positioned for capturing bodily vibration sound waves.

30. The system for acoustical communication according to claim 29, wherein said second directionally dependent microphone is a contact microphone.

31. The system for acoustical communication according to claim 29, wherein said one or more voice signals captured by said first directionally dependent microphone are filtered by said control module based on said one or more voice signals captured by a third directionally dependent microphone.

32. The system for acoustical communication according to claim 29, comprising an amplifier controlled by one or more voice signals captured by a third directionally dependent microphone.

33. The system for acoustical communication according to claim 29, wherein said one or more voice signals captured by a directionally dependent microphone are processed based on reference filters.

34. The system for acoustical communication according to claim 29, wherein at least one directionally dependent microphone is included in at least one microphone array.

35. The system for acoustical communication according to claim 34, wherein said at least one microphone array is implemented in MEMS technology.

36. The system for acoustical communication according to claim 29, wherein said one or more external electronic devices comprises a mobile radio device.

37. The system for acoustical communication according to claim 29, comprising a speech recognition module configured to capture spoken commands via at least one directionally dependent microphone.

38. The system for acoustical communication according to claim 29, comprising: at least one of: Bluetooth, ZigBee, GSM and UMTS interfaces.

* * * * *